(12) United States Patent
Jam et al.

(10) Patent No.: US 7,397,376 B2
(45) Date of Patent: Jul. 8, 2008

(54) OBJECT TRACKING METHOD AND SYSTEM USING TAGS

(75) Inventors: Mehrban Jam, Fremont, CA (US); Salil Pradhan, San Jose, CA (US); Cyril Brignone, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 296 days.

(21) Appl. No.: 11/265,362

(22) Filed: Nov. 1, 2005

(65) Prior Publication Data

US 2007/0096907 A1 May 3, 2007

(51) Int. Cl.
*G08B 13/14* (2006.01)
(52) U.S. Cl. .................. 340/572.4; 235/376; 705/7
(58) Field of Classification Search .............. 340/572.1, 340/572.4, 505, 506, 10.1; 705/28, 7; 235/376; 342/450, 451, 463
See application file for complete search history.

(56) References Cited

U.S. PATENT DOCUMENTS

| 5,565,858 | A | * | 10/1996 | Guthrie ..................... 340/10.1 |
| 5,959,568 | A | * | 9/1999 | Woolley ..................... 340/10.1 |
| 6,040,774 | A | * | 3/2000 | Schepps ................... 340/572.1 |
| 6,480,108 | B2 | * | 11/2002 | McDonald .................. 340/505 |
| 6,552,661 | B1 | * | 4/2003 | Lastinger et al. ......... 340/572.1 |
| 6,662,068 | B1 | * | 12/2003 | Ghaffari ..................... 700/115 |
| 6,726,099 | B2 | * | 4/2004 | Becker et al. ............... 235/380 |
| 6,860,422 | B2 | * | 3/2005 | Hull et al. .................... 235/376 |
| 6,917,291 | B2 | * | 7/2005 | Allen ....................... 340/572.1 |
| 6,933,849 | B2 | * | 8/2005 | Sawyer ..................... 340/572.4 |
| 2004/0119605 | A1 | * | 6/2004 | Schaper ................. 340/825.49 |
| 2006/0290473 | A1 | * | 12/2006 | Mahasenan et al. ........ 340/10.2 |
| 2007/0018829 | A1 | * | 1/2007 | Singh et al. ............. 340/572.4 |

* cited by examiner

*Primary Examiner*—Thomas Mullen

(57) ABSTRACT

A method and system of tracking documents uses tags and a workflow. Initially, a workflow is developed for each document or type of documents using a state diagram. The workflow specifies a subset of one or more destinations that the document is allowed to travel and a sequence for this travel. A tag is associated with each document to enable tracking of the document as it passes the one or more readers in the various destinations. These tag readers in turn report back position information on the document to assist in locating the document. A comparison between the state diagram for the workflow and the position information gathered from the tag readers determines if the document is outside the desired workflow. An alert is generated when the document is outside the workflow and not being processed as intended.

25 Claims, 6 Drawing Sheets

OBJECT TRACKING METHOD AND SYSTEM USING TAGS

BACKGROUND

Despite advances in paperless offices, documents remain an important part of many businesses. The ability to quickly locate and obtain documents enables a company to process information more rapidly and serve their customers with a higher level of service. This is particularly true in the medical and legal professions as the information in a document often has significant impact on the patients or clients being assisted. Many other professions or business would also benefit from managing documents carefully and accurately.

Unfortunately, document management is a particular problem in larger organizations that require many individuals to process each document. Each time a document changes hands between different people there is a distinct possibility the document and the folder holding the document may become lost or misplaced. It is possible that people may change jobs and leave a company without returning all the files to a central location or storage.

It is also difficult to also keep track of the people or members of an organization who have accessed certain documents. First, it is an administrative hurdle to require each person that touches a document or has accessed a folder of documents to enter a note to that effect. Second, some people may not want to admit seeing or accessing a document in every instance.

Alternatively, others may indicate they have accessed a file but in reality may not have touched or seen any documents associated with the file. For example, a doctor may be required to review a patients' medical charts every shift but may forget on occasion to do so in a timely manner. While these problems seem limited to documents, they also apply to tracking objects of many different types and as used in different business contexts. For example, many of the same problems encountered with documents can also be found in tracking various objects in various manufacturing and assembly-line situations. Conventional approaches do not provide a simple and effective method of tracking the location and the chain of custody associated with documents and these other types of objects.

BRIEF DESCRIPTION OF THE DRAWINGS

Like reference numbers and designations in the various drawings indicate like elements.

SUMMARY

Figure 1A:
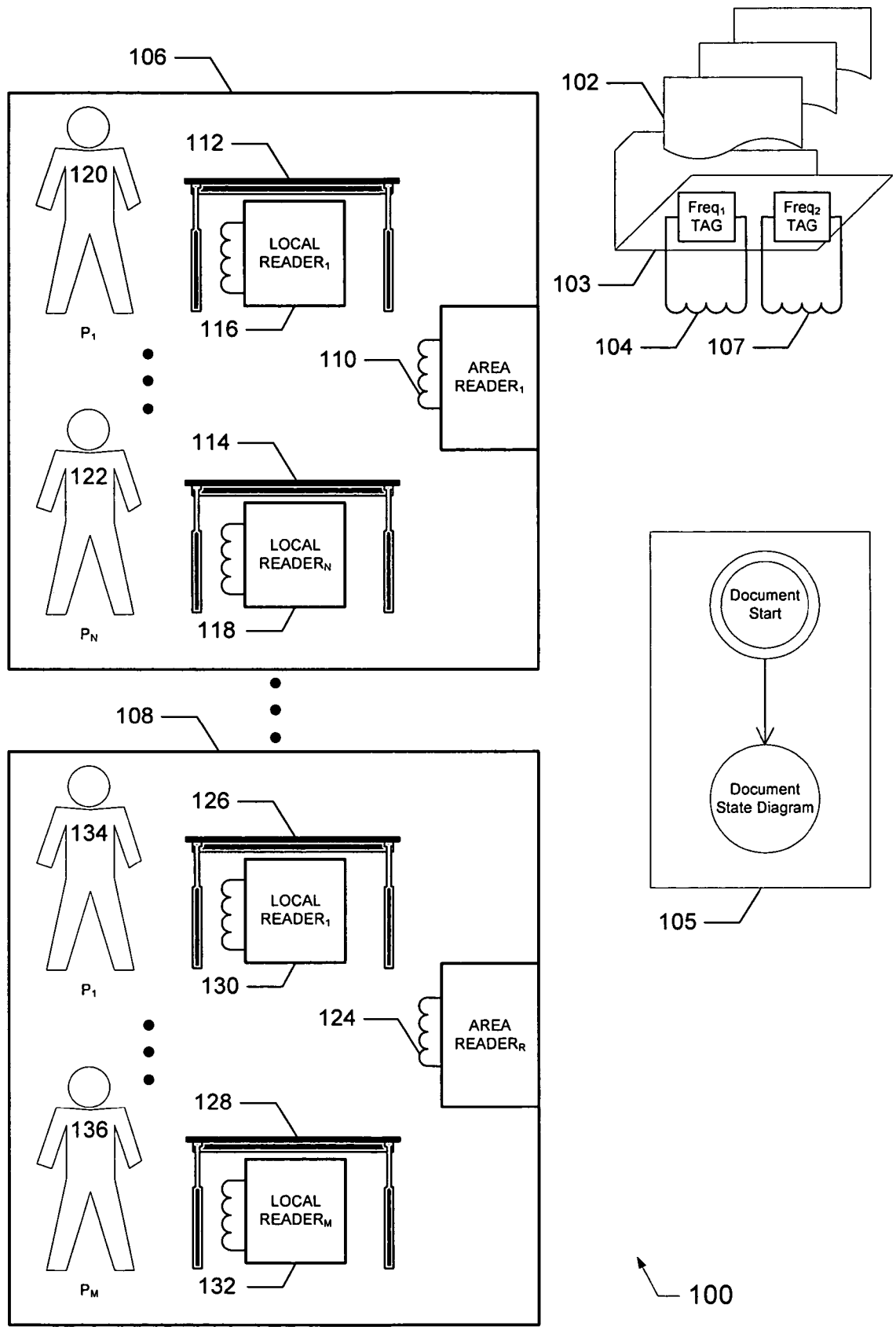
FIG. 1A is a schematic diagram of a system for tracking a document with a particular workflow arrangement according to various implementations of the present invention.

One aspect of the present invention features a method and system of tracking an object using tags and a workflow. Initially, a workflow is developed for each object or type of objects using a state diagram. The workflow specifies a subset of one or more destinations that the object is allowed to travel and a sequence for this travel. A tag is associated with each object to enable tracking of the object as it passes the one or more readers in the various destinations. These tag readers in turn report back position information on the object to assist in locating the object and maintaining the workflow. A comparison between the state diagram for the workflow and the position information gathered from the tag readers determines if the object is outside the desired workflow.

DETAILED DESCRIPTION

Implementations of the present invention are used for tracking objects according to a particular workflow. The document described herein below in conjunction with aspects of the present invention is one example metaphor for tracking an object according to a particular workflow. Accordingly, a combination of tag readers located in various locations in an organization keep track of documents as they move and are used by different people and groups. Documents are grouped together and associated with a tag to ensure they can be readily identified and to develop a chain of custody for the documents. By specifying a particular workflow for each group of documents, information passes to the appropriate people in an organized and efficient manner.

While there are many advantages to the present invention, a few of these advantages have been included herein. Accurately tracking documents in accordance with implementations of the present invention makes it relatively easy to locate a document quickly. Tag readers located throughout an enterprise continually report the whereabouts of various document tags to a database. The database can be occasionally queried to receive up to date location information. Instead of searching in many areas for a document or documents, implementations of the present invention can narrow the search to a room, a desk or even a file cabinet.

Documents are accurately located using two tag readers operating at different frequencies. An area tag reader having a greater range can locate a document and tag receptive to a first frequency in a larger area while a local tag reader operating at a lower frequency can locate the document within a smaller area by interacting with another tag associated with the document receptive to lower frequencies. This combination of two tag readers and tags accurately identifies the location of a document with few errors and minimal distraction to a user or other person using the document.

Workflows associated with documents can not only be specified but enforced. Aspects of the present invention not only ensure that documents are handled by authorized parties but also that the documents are passed along in a particular sequence. If documents do not at least pass in the vicinity of a person's office or desk then they are identified as being improperly processed and outside the designated workflow. These workflows may also be designed to ensure certain individuals in receipt of the document actively process certain aspects of the document using one or more different devices before continued processing. For example, a workflow may specify that each person reviewing a patient's medical record enter a password or biometric entry (e.g., a thumbprint or voice print) on a computer before the medical record is released to the subsequent steps of the workflow. Many other advantages are also contemplated but have not been listed for the sake of brevity.

FIG. 1A is a schematic diagram of a system 100 for tracking a document with a particular workflow arrangement according to various implementations of the present invention. In this illustrated example, system 100 includes documents 102, a frequency$_1$ tag 104, frequency$_2$ tag 107, a folder 103 for holding documents 102, a workflow 105 and a number of areas depicted as areas 106 through 108 to represent the different areas documents 102 can travel.

Documents 102 is a metaphor that includes a single paper, many papers, books, manuals or any other combination of one or more physical objects to be passed along workflow 105. As previously described, a document can be any object that needs to be tracked according to a workflow. In one implementation, these objects may be patients' medical records used by doctors to track and analyze a medical condition or history. Alternatively, the objects can also be legal documents related to a court case or other legal matter and used by lawyers to understand a client's legal situation and provide legal counseling. Accordingly, reference made to a document or documents is merely one convenient example and implementations of the present invention are contemplated to also include a wide range of other objects susceptible to benefit from accurate tracking and chain of custody information.

It is contemplated that documents 102 can also be any physical object that needs to travel through a workflow where a chain of custody is also important and therefore do not have to necessarily be papers. Likewise, folder 103 can be any container for holding physical objects and is not limited to folders used for paper goods and the like. Accordingly, while it is convenient to discuss aspects of the present invention for tracking documents 102 kept in folders 103 there is no reason to limit the scope of the invention to tracking these specific objects. For example, various aspects of the present invention could also be adapted for tracking any physical evidence during litigation or prosecution and ensuring the chain of custody is known to deter tampering or tainting certain evidence. It could also be applied in food processing and pharmaceuticals, for example, to ensure product safety and accountability for manufacturing and other duties.

Frequency$_1$ tag 104 and frequency$_2$ tag 107 can be tags attached directly to documents 102 or may be attached to folder 103 or a box for holding documents 102. To ensure that documents 102 are tracked by frequency$_1$ tag 104 and frequency$_2$ tag 107, there are many security mechanisms for associating documents 102 more permanently with tag 104. For example, frequency$_1$ tag 104 and frequency$_2$ tag 107 can be embedded in folder 103 which is then sealed around documents 102. Attempting to remove folder 103 sealed around documents 102 may damage frequency$_1$ tag 104 and frequency$_2$ tag 107 and thereby identify a party's unauthorized actions. Typically, frequency$_1$ tag 104 and frequency$_2$ tag 107 are implemented as passive tags to keep costs lower and improve the shelf life of the tag while in transit or storage.

Workflow 105 represents a sequence of events to be performed in association with documents 102. Various implementations of the present invention model the workflow using a state diagram that indicates various states of processing and conditions for moving from one state to another state in the state diagram. For example, moving between two different states in the state diagram may require a signature or biometric stamp from an individual to advance to the next state. The state diagram can be complex or relatively simple depending on the complexity of the workflow being implemented for the document. Specific workflows can be created in advance for an organization having documents with specific workflow requirements. For example, a medical patient's chart may first go to a nurse practitioner who takes a temperature, weighs an individual, checks ears for infection and performs any other basic actions necessary to prepare for a visit by a doctor. Other workflows may require a patient's initial medical history information to be entered into a medical records database before assigning a patient and their medical records to an examination room in a clinic or hospital. Many other workflows can be developed to mimic any sequence of events typically taken with documents 102 in a business or clinical context.

Area 106 through area 108 each represents one or more different places that documents 102 may travel during a workflow. These areas may be identical or vastly different in their purpose and so the tag readers in each area may have different operating criteria. In this example, area 106 has an area reader1 110 and a set of local readers indicated as local reader$_1$ 116 through local reader$_N$ 118 or each desk 112 through 114. In this example, the desks correspond to individuals 120 through 122; however desks in this context could also correspond to pools of individuals or other people performing similar tasks. Likewise, area 108 has an area reader$_R$ 124 and a set of local readers indicated as local reader$_1$ 130 through local reader$_M$ 132 for each desk 126 through 128. Once again, the desks correspond to individuals 126 through 128; however desks in this context could also correspond to pools of individuals or other people performing similar tasks. It is also contemplated that instead of actual desks, these areas could be cubicles, work spaces, work benches, areas on an assembly line or any place associated with an individual or group of individuals performing a similar task.

In practice, documents 102 are passed either automatically or manually to one or more areas 106 through 108. Area reader$_1$ 110 through area reader$_R$ 124 determine when one of documents 102 is in the general vicinity. Area reader$_1$ 110 through area reader$_R$ 124 operate at a higher frequency and are able to detect documents 102 over a wider coverage area. In particular, frequency$_1$ tag 104 can be designed to be more receptive to signals received from area reader$_1$ 110 through area reader$_R$ 124. For example, a workflow may only require that any one person in the group of people in area 106 receive a document for processing.

Once the area is determined, local reader$_1$ 116 through local reader$_N$ 118 are used to detect that documents are assigned to one of the individuals 120 through 122 associated with one of the desks 112 through 114 or local reader$_1$ 130 though local reader$_M$ 132 ensures assignment to individuals 134 though 136 associated with desks 126 through 128. For example, local reader$_1$ 116 through local reader$_N$ 118 operate at a lower frequency and detect documents 102 over a smaller coverage area. In particular, frequency$_2$ tag 107 can be designed to be more receptive to signals received from local reader$_1$ 116 through local reader$_N$ 118. Workflow 105 can specify a sequence that documents 102 pass to one or more different areas, one or more different desks or specific individuals. It may even be used to ensure a document is placed in particular cabinet or storage area for safekeeping or organizational purposes. As previously described, additional conditions of workflow 105 may require individuals to perform one or more tasks and also enter a signature, electronic signature or biometric entry indicating that the one or more prescribed steps have been taken.

Figure 1B:
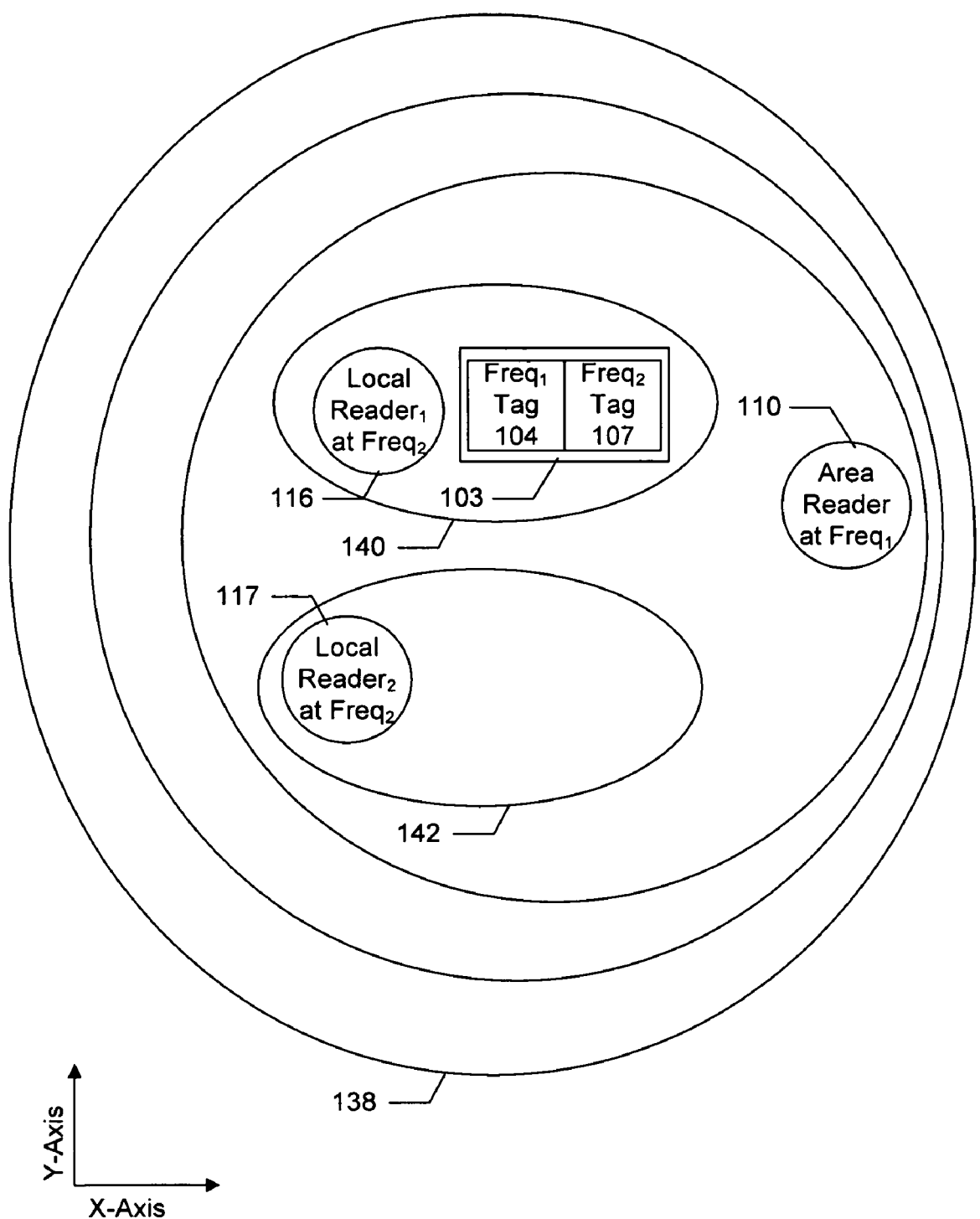
FIG. 1B is another schematic diagram for using an area tag reader and local tag reader operating at different frequencies to accurately locate a document having one or more tags receptive to the different frequencies.

FIG. 1B is another schematic diagram for using an area tag reader and local tag reader operating at different frequencies to accurately locate a document having one or more tags receptive to the different frequencies. This diagram illustrates an area reader at frequency$_1$ 110 along with a theoretical area coverage 138 used to detect documents (not illustrated) in folder 103 having frequency$_1$ tag 104 and frequency$_2$ tag 107. Local reader$_1$ 116 at frequency$_2$ and local reader$_2$ 117 at frequency$_2$ instead operate at a lower frequency having a different theoretical local coverage 140 and 142 respectively as illustrated in this example.

In the example depicted, area reader at frequency$_1$ 110 can determine the presence of documents in folder 103 within the area coverage 138. frequency$_1$ tag 104 responds to area reader at frequency$_1$ 110 as it has an antenna and system design that better matches the signal sent over area coverage 138. For example, area reader at frequency$_1$ 110 can be operating in a UHF (ultra-high frequency) ranging from 900 MHz and higher to cover an approximate radius of 10 meters.

Local reader$_1$ 116 at frequency$_2$ operating at the lower frequency is able to more precisely locate documents in folder 103 within its local coverage 140. The position of documents in folder 103 are limited to a smaller area indicated by local coverage 140 as illustrated. For example, Local reader$_1$ 116 at frequency$_2$ can be operating in a HF (high frequency) at approximately 13.5 MHz and cover an approximate radius of 1 meter.

Even if local reader$_1$ 116 at frequency$_2$ fails, it is still possible to more accurately identify the location of documents in folder 103 by comparing the coverage of the local readers and the area readers. For example, local reader$_2$ 117 at frequency$_2$ operating correctly and not detecting documents in folder 103 can be used to deduce that documents in folder 103 are not in local coverage 142 yet somewhere within area coverage 138. Many other approaches to locating documents in folder 103 using a combination of one or more tag and tag readers operating at one or more different frequencies are contemplated.

Figure 2:
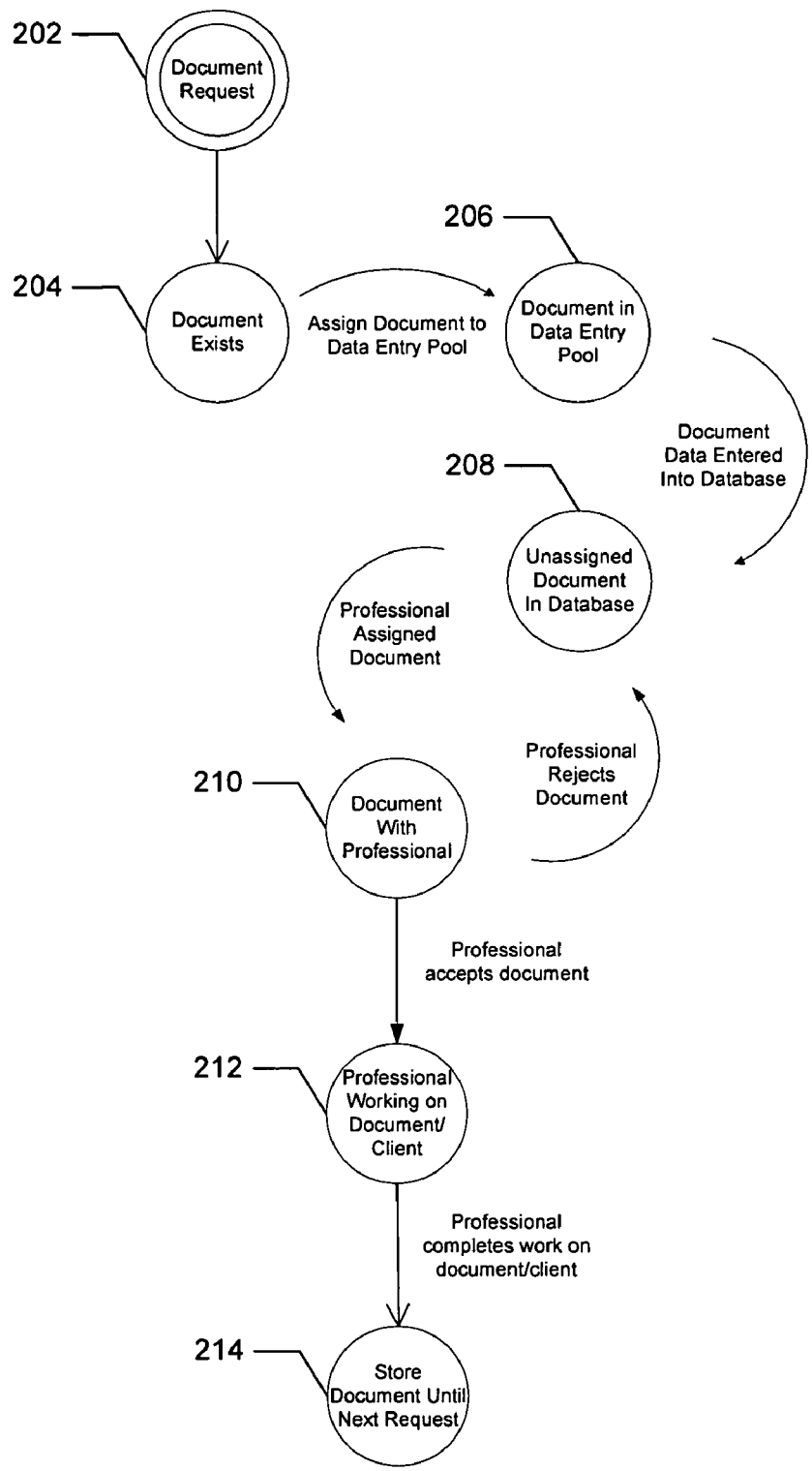
FIG. 2 depicts a workflow created for use with various implementations of the present invention.

FIG. 2 depicts a workflow created for use with various implementations of the present invention. One implementation of the present invention models the workflow using a state diagram having one more states and actions between the states that determine specific transitions. Initially, the state diagram begins with a start state 202 receiving a document request. For example, the document request could be for a medical record. Next, an unconditional transition is then made to a document exists state 204 that indicates that the requested document both exists and has been located. For example, the document could be a medical record for a patient about to visit with a doctor or a legal file for a client seeing a lawyer.

At this point, the action of assigning the document to a data entry pool occurs and the transition is made to a document in data entry pool state 206. For example, data entry pool state 206 may require that any one of several different administrators update the patient or client file and computer system indicating details of the particular medical procedure to be performed or details of the client visit. Workflow 200 may use an area tag reader to ensure that the document is processed in a particular room and then use a particular local tag reader to merely record which individual in the room actually performed the specified task or action.

Once document data is entered into the database then a transition is made to an unassigned document in database state 208. In this state, the document awaits assignment to a professional to be acted upon further. For example, a document can be assigned to a doctor seeing a patient in an examination room or the document can be assigned to the attorney handling a specific matter or issue for a client. The action of assigning the document to a professional causes a transition to a document with professional state 210.

At document with professional state 210, there are two different possible transitions. The professional can perform a rejection of the document and assignment causing a transition back to unassigned document in database 208 or the professional can accept the document and the transition is instead made to professional working on document/client 212. In each of these and the aforementioned states, one or more of the various tag readers keep track of the position of the documents and their position in an organization. Deviations from the specified workflow generates an alert or error message indicating that the document is not being processed properly or at least that further investigation into the workflow for the document is needed. Further details on this processing are described later herein.

In this particular example, the professional completes working on the document at some point in the future and the transition to store document until next request state 214 is entered. This latter state could require that the patient's or client's documents are placed back in the appropriate filing cabinet or storage location.

Figure 3:
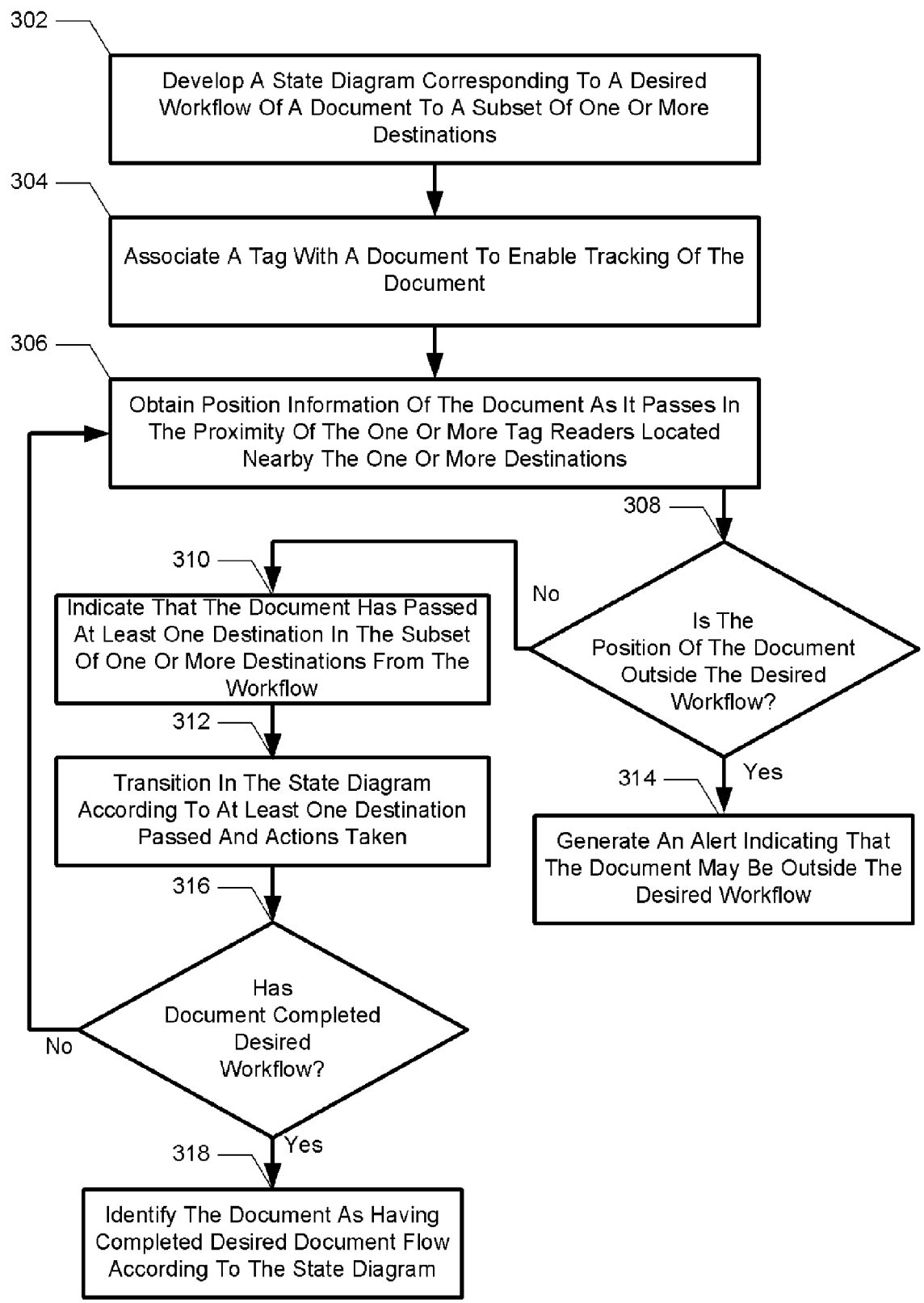
FIG. 3 depicts the operations associated with using a workflow and one or more tag readers in accordance with implementations of the present invention.

FIG. 3 depicts one or more operations associated with using a workflow and one or more tag readers in accordance with implementations of the present invention. Initially, a state diagram already exists or is developed corresponding to a desired workflow of a document to a subset of one or more destinations (302). The state diagram can indicate that a document should go to specific sites, buildings, rooms, desks or people in a particular sequence. Tag readers employed as previously described track the whereabouts of the documents as they are processed. Additionally, the state diagram also will indicate what actions need be taken, if any, to effectuate a transition between different states of the state diagram.

Next, implementations of the present invention associate a tag with a document to enable tracking of the document (304). In some cases, tags are embedded in folders or other containers that envelop the documents while in other cases, the tags can be made integral to the documents themselves. As previously described, implementations of the present invention are not limited to documents but instead can be used to track any number of physical objects that would benefit from a known chain of custody or workflow arrangement.

Once the documents are tagged, one or more of the tag readers located nearby the one or more destinations obtain position information as the tags associated with the documents pass by (306). Different tag readers with different capabilities are used to identify and locate documents as they are transported. For example, an area tag reader capable of detecting tags in a larger area may be used to determine if a document and corresponding tag are in a particular room or building. Tag readers such as a local tag reader may have a more limited range of detection but are instead capable of discriminating whether a tag is located on one desk or another desk in the same room, building or area.

At this point, implementations of the present invention determine if the position of the document is outside the desired workflow (308). A comparison is made between the location a document should be in according to a workflow against the position information obtained previously using the one or more tag readers. When the document is outside the workflow, implementations of the present invention generate an alert indicating that the document may be outside the desired workflow (314). One implementation of the present invention may continue to track the document without concern for the workflow as the document is no longer on the workflow track. Alternate implementations may attempt to later complete the workflow even though the document veered outside the workflow requirements specified.

In the event the document remains in the workflow, an indication is made that the document has passed at least one destination in the subset of one or more destinations from the workflow (310). For example, this could mean that the document has arrived in the correct building, room, or on the desk of the correct person. A transition occurs in the state diagram of the workflow when one or more actions are taken and at least one destination is passed (312). A person receiving a document and signing for it could enable the state diagram to pass from one state to another state in the state diagram of the workflow.

At each transition, a determination is made to see if the document has completed the designated workflow or needs further processing (316). If the state diagram and workflow has more states and processing then the operations continue and the position information of the document continues to be tracked (306). Alternatively, the workflow may be completed if no more states in the workflow exist and the document or task has been completed. Accordingly, implementations of the present invention identify the document has having completed the desired document flow according to the state diagram (318) if this latter condition is met.

Figure 4:
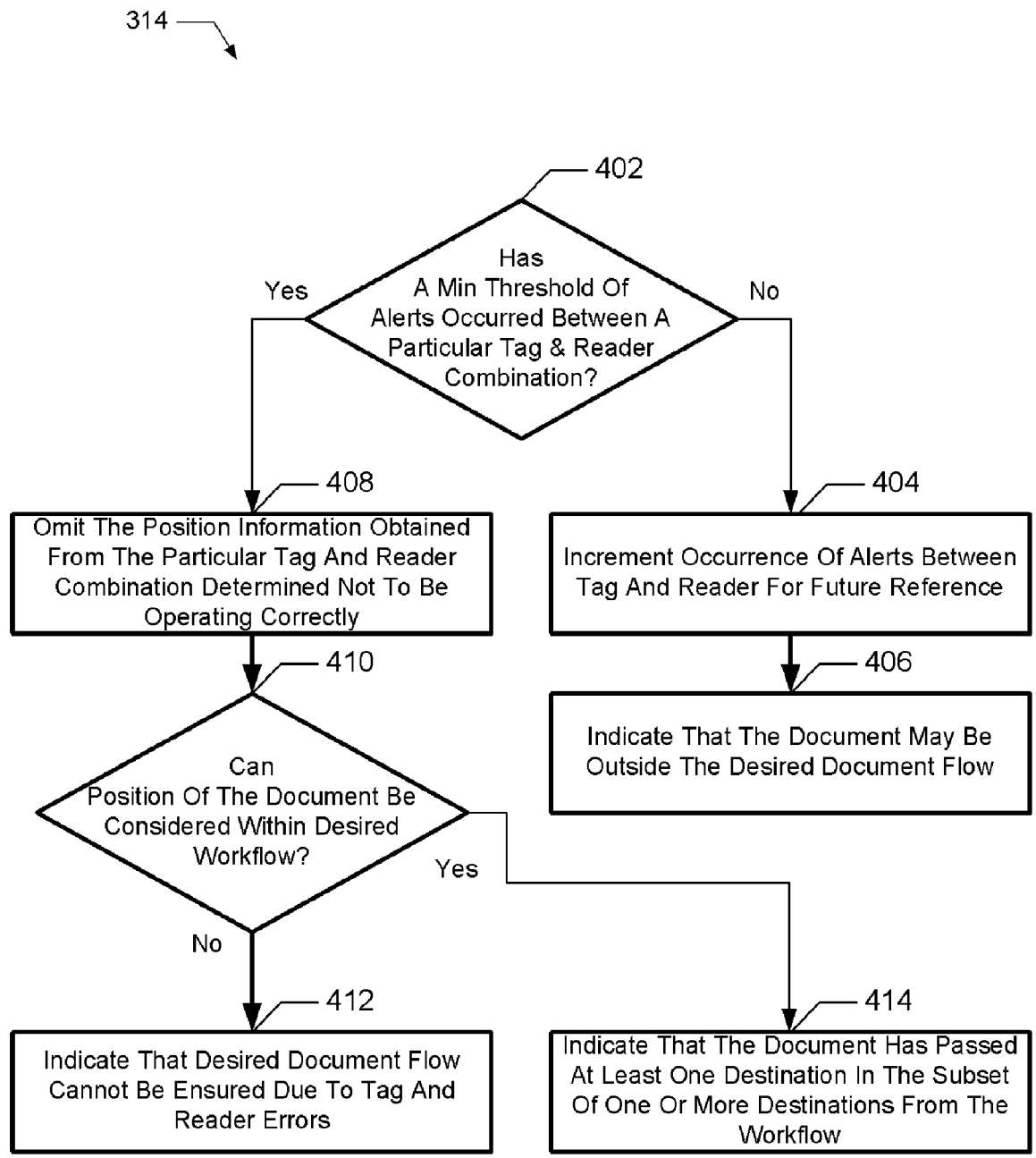
FIG. 4 is a flowchart depicting the operations associated with self-healing a workflow and set of tag readers implemented in accordance with aspects of the present invention.

FIG. 4 is a flowchart depicting the operations associated with self healing a workflow and set of tag readers implemented in accordance with aspects of the present invention. In some cases, a document may appear outside a specified workflow, as in 314 in FIG. 3, due to hardware or software failures of one or more tag readers. Further processing can help determine whether the document is actually outside the specified workflow or whether a portion of the tag readers in a network have become unreliable and in need of attention or repair. If it is possible, implementations of the present invention can self-heal by either ignoring position information taken from failing tag readers or relying on position information from other tag readers to otherwise determine the position of a document and tag.

When a document appears to be outside a workflow, implementations of the present invention compare a minimum threshold of alerts with the number of alerts generated between a particular tag and reader combination (402). Initially, the number of alerts is set to zero or a small number so the assumption is that the tag reader and tag are working properly. Consequently, the self-healing operation increments the occurrence of alerts between the tag and-reader for future reference (404) and then provides an indication that the document may be outside the desired document flow (406). This typically creates an alert on a document management console or generates an email indicating that the document may not have been processed according to the workflow.

Alternatively, implementations of the present invention assume there is a tag and reader problem when the minimum threshold of alerts is met between the same tag and reader (402). Using the alerts and other information, the position information obtained from the particular tag and reader combination is omitted if it is determined that the tag and reader is not operating correctly (408). Next, a determination is made whether the position of the document appears to be within the desired workflow now that certain unreliable position information has been omitted (410). For example, a local tag reader at a desk may indicate that a document is in the correct position according to the workflow yet a failing area tag reader in another room or area may incorrectly detect the presence of the particular document and tag. By eliminating the latter position information, the document may otherwise appear to be in the proper location and an indication is provided that the document has passed at least one destination in the subset of one or more destinations from the workflow (414). Alternatively, the position of the document may remain uncertain once the position data is omitted and consequently implementations of the present invention will indicate that the desired workflow cannot be ensured due to certain tag and reader errors (412).

Figure 5:
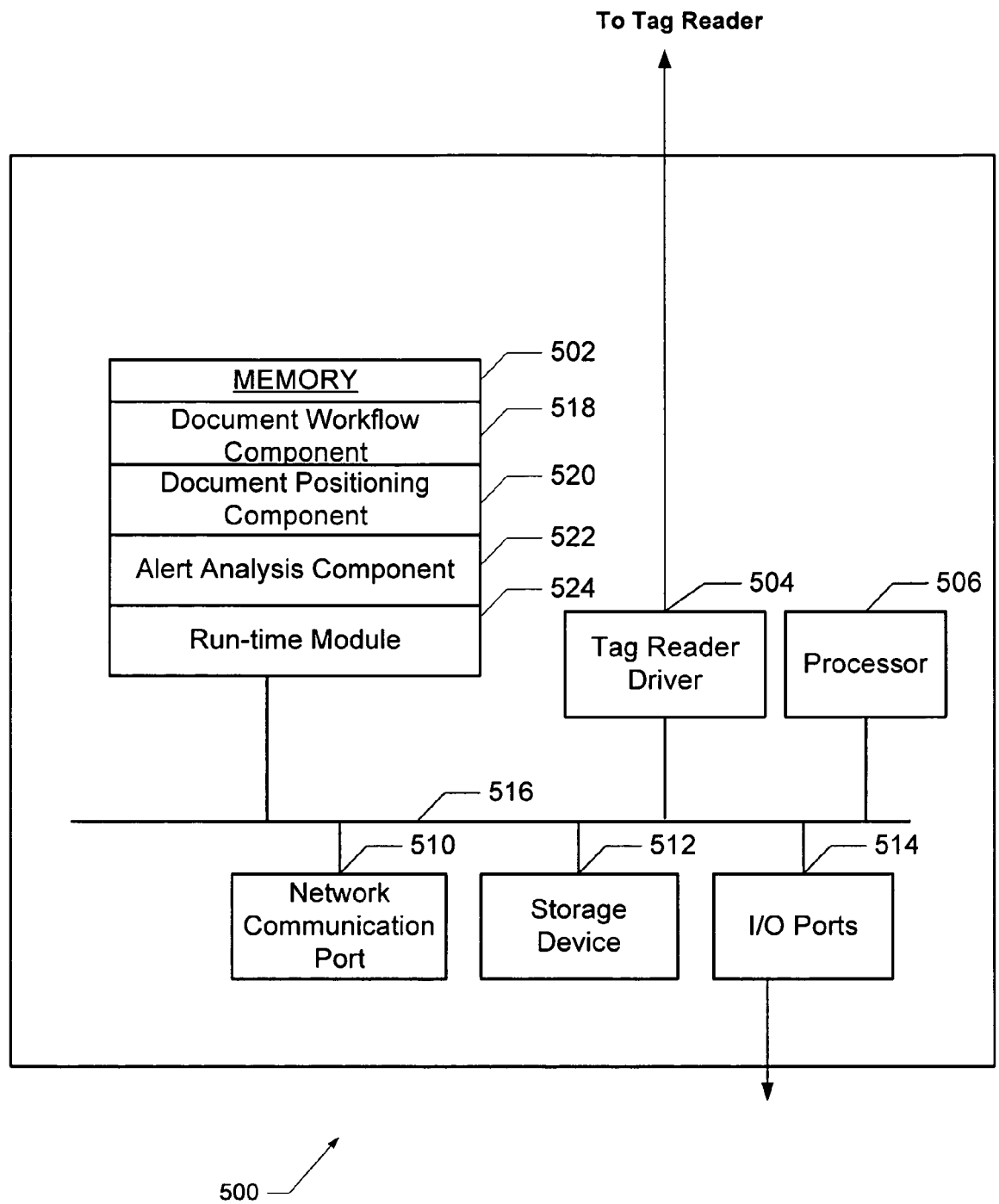
FIG. 5 is a schematic diagram of a tag reader system and workflow used to track documents in accordance with one implementation of the present invention.

FIG. 5 is a schematic diagram of a tag reader system 500 (hereinafter system 500) and workflow used to track documents in accordance with one implementation of the present invention. System 500 includes a memory 502 to hold executing components or programs (typically random access memory (RAM) or read-only memory (ROM) such as a flash RAM), a tag reader driver 504, a processor 506, a network communication port 510 for data communication, a storage device 512, and input/output (I/O) ports 514 with integrated I/O controller operatively coupled together over an interconnect 516. System 500 can be preprogrammed, in ROM, for example, using field-programmable gate array (FPGA) technology or it can be programmed (and reprogrammed) by loading a program from another source (for example, from a floppy disk, a CD-ROM, or another computer). Also, system 500 can be implemented using customized application specific integrated circuits (ASICs).

In one implementation, memory 502 includes document workflow component 518, document positioning component 520, alert analysis component 522 and run-time module 524 that manages the resources associated with system 500. In operation, document workflow component 518 processes a state diagram developed to monitor the workflow of a document as it moves to different destinations and different actions occur. Depending on the position information and actions, document workflow component 518 transitions to different states in the state diagram until processing of the document is completed.

Document positioning component 520 gathers position information for the documents received from one or more tag readers. The position information is compared against the workflow and destinations intended for the different documents. If a document appears within the workflow then processing continues uninterrupted; however a document appearing outside the workflow may create alerts to be further investigated.

Alert analysis component 522 keeps track of alerts and determines a course of action to take when alerts occur. In one case, alert analysis component 522 may indicate that one or more tag and/or readers are failing or inoperable yet the document still appears to be within the desired workflow. However, it is also possible that the alert analysis component 522 cannot determine whether certain tags or readers are failing and even so, whether the document remains within or outside the desired workflow for the document.

While examples and implementations have been described, they should not serve to limit any aspect of the present invention. Accordingly, implementations of the invention can be implemented in digital logic, electronic circuitry, or in computer hardware, firmware, software, or in combinations of them. Apparatus of the invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read only memory and/or a random access memory. Generally, a computer will include one or more mass storage devices for storing data files; such devices include magnetic disks, such as internal hard disks and removable disks; magneto optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto optical disks; and CD ROM disks. Any of the foregoing can be supplemented by, or incorporated in, ASICs.

While specific embodiments have been described herein for purposes of illustration, various modifications may be made without departing from the spirit and scope of the invention. As previously described, a document is merely one example or metaphor for a wide range of objects that need to be tracked and monitored according to a particular workflow. It is therefore contemplated that the descriptions hereinabove can also be applied to other contexts including general business, manufacturing, medicine, pharmaceuticals, law enforcement or any other environment that may require tracking an object in a workflow contact. For example, in law enforcement it may be necessary to keep track of forensic evidence taken from a crime scene and the chain of custody prior, during and after a trial to avoid claims of tainted evidence. Similarly, objects in a manufacturing context may include keeping track of expensive, complex or sensitive equipment being installed in planes, automobiles or other vehicles. In hospitals and medical environments, it is also important to keep track of medicines, hazardous wastes and other objects according to government and privately established guidelines and requirements. Accordingly, the invention is not limited to the above-described implementations, but instead is defined by the appended claims in light of their full scope of equivalents.

What is claimed is:

1. A method of tracking an object, comprising:
    developing a state diagram corresponding to a desired workflow of an object to a subset of one or more destinations;
    associating one or more tags with an object to enable tracking the position of the object;
    obtaining position information of the object as it passes in the proximity of one or more tag readers located nearby the one or more destinations; and
    determining if the position of the object is outside the desired workflow according to the state diagram.

2. The method of claim 1 further comprising:
    generating an alert indicating that the object may be outside the desired workflow according to the determination and the state diagram.

3. The method of claim 2 wherein generating the alert further includes making an entry in a database record to indicate the time, date and transaction associated with the alert.

4. The method of claim 2 wherein generating the alert further comprises:
    determining if a minimum threshold of alerts has occurred between a particular tag and reader combination;
    omitting, when the minimum threshold of alerts has been met, the position information obtained from the particular tag and reader combination deemed to be not operating properly; and
    indicating that the position of the object is considered within a desired workflow when the position information from the particular tag and reader combination is omitted.

5. The method of claim 4, further comprising:
    indicating that the desired workflow cannot be ensured as a result of the particular tag and reader combination deemed to be not operating properly.

6. The method of claim 1 wherein an object includes one or more objects selected from a set of objects including: a document, a manufactured product, forensic evidence, equipment, medicines and hazardous wastes.

7. The method of claim 1 further comprising:
    indicating that the object has passed at least one destination in the subset of one or more destinations from the workflow and in accordance with the state diagram; and
    transitioning in the state diagram according to the at least one destination passed.

8. The method of claim 7 wherein transitioning in the state diagram further depends on performing one or more actions associated with a transition between states in the state diagram.

9. The method of claim 1 wherein the subset of one or more destinations is selected from a set of destinations including a building, a workroom having multiple desks, an office having an individual desk, an individual desk within a room and a file cabinet within a room.

10. The method of claim 1 wherein the state diagram used for the desired workflow identifies one or more destinations combined with one or more actions to take place at the one or more destinations.

11. The method of claim 10 wherein the one or more destinations include a doctor's office and the one or more actions includes a medical procedure in view of the information in the object.

12. The method of claim 10 wherein the one or more destinations include an attorney's office and the one or more actions includes providing legal analysis in view of the information in the object.

13. The method of claim 1 wherein the one or more tag readers includes a local tag reader capable of detecting an object having a tag within an area generally associated with a particular person.

14. The method of claim 13 wherein the one or more tag readers further includes an area tag reader capable of detecting an object having a tag within an area associated with one or more people.

15. The method of claim 14 wherein the local tag reader operates at a lower frequency and has a smaller coverage for detecting the position of the object compared with the area tag reader that operates at a higher frequency and has a larger coverage for detecting the position of the object.

16. The method of claim 1 wherein the one or more tags includes a first tag responsive to a lower frequency and a second tag responsive to a higher frequency.

17. The method of claim 1 wherein the object is outside the desired workflow when an expected position for the object identified in the state diagram is different from the position for the object obtained by way of the one or more tag readers.

18. A system for tracking objects, comprising:
an object associated with a tag capable of being detected by one or more tag readers;
a processor capable of processing instructions;
a memory capable of holding instructions when executed on the processor that obtain position information of the object as it passes in the proximity of one or more tag readers located nearby one or more destinations, determines if the position of the object is outside a desired workflow according to a state diagram and generates an alert indicating that the object may be outside the desired workflow according to the determination and the state diagram.

19. An apparatus for tracking objects, comprising:
means for developing a state diagram corresponding to a desired workflow of an object to a subset of one or more destinations;
means for associating a tag with an object to enable tracking of the object;
means for obtaining position information of the object as it passes in the proximity of one or more tag readers located nearby the one or more destinations;
means for determining if the position of the object is outside the desired workflow according to the state diagram; and
means for generating an alert indicating that the object may be outside the desired workflow according to the determination and the state diagram.

20. A location detecting apparatus comprising:
a first reader operating at a higher frequency and capable of detecting an object having a first tag responsive to the higher frequency in a larger coverage;
a second reader operating at a lower frequency and capable of detecting an object having a second tag responsive to the lower frequency in a smaller coverage; and
a logic circuit that determines a position of the object by comparing the coverage of the first reader with the coverage of the second reader.

21. The apparatus of claim 20 further comprising:
an object having a first tag responsive to the higher frequency from the first tag reader and a second tag responsive to the lower frequency from the second tag reader.

22. The apparatus of claim 20 wherein the higher frequency includes ultra-high frequencies (UHF) in a range of 900 MHz and higher.

23. The apparatus of claim 20 wherein the lower frequency includes high frequencies (HF) at approximately 13.5 MHz.

24. The apparatus of claim 20 wherein the object is selected from a set of objects including: general documents, medical records, legal documents and legal evidence used in a trial.

25. The apparatus of claim 20 wherein the object includes one or more objects selected from a set of objects including: a document, a manufactured product, forensic evidence, equipment, medicines and hazardous wastes.

* * * * *